3,336,339
δ-LACTONES OF 5-HYDROXY-3-KETO-6,6-BIS(PER-FLUOROALKYL) - 4 - HEXENOIC ACIDS AND PREPARATION THEREOF
David C. England, Wilmington, Del., assignor to E. I. du Pont de Nemours and Company, Wilmington, Del., a corporation of Delaware
No Drawing. Filed Dec. 8, 1965, Ser. No. 512,531
11 Claims. (Cl. 260—343.5)

This application relates to novel δ-lactones of 4-hexenoic acid and to the processes for their preparation.

More specifically, this application relates to δ-lactones of 5-hydroxy-3-keto-6,6-bis(perfluoroalkyl) - 4 - hexenoic acids substituted in the 2 position and to the processes for their preparation.

The prior art long has recognized that ketene, the first member of the homologous series of aldoketenes spontaneously dimerizes to produce the β-lactone of 3-hydroxy-3-butenoic acid and that said β-lactone dissociates at elevated temperatures to ketene. Bis(perfluoroalkyl) ketenes do not spontaneously dimerize, for example, bis (trifluoromethyl)ketene does not dimerize on heating for a period of time of about 8 hours at a temperature of about 200° C. (See copending coassigned application of Sam Andreades and David C. England, S.N. 283,958, filed May 29, 1963, now abandoned.) However, bis (perfluoroalkyl)ketenes react in the presence of nucleophilic catalysts to produce a variety of products (see copending coassigned application of David C. England and Carl G. Krespan, S.N. 369,588, filed May 22, 1964, now U.S. 3,280,150). It has been shown that a spontaneous reaction between bis(perfluoroalkyl)ketenes and aldoketenes occurs (see copending coassigned application of David C. England and Carl G. Krespan, S.N. 512,532, filed Dec. 8, 1965). For example, bis (trifluoromethyl) ketene and ketene spontaneously react to produce the β-lactone of 3-hydroxy-4,4-bis(trifluoromethyl)-3-butenoic acid.

It now has been discovered that the β-lactone of 3-hydroxy - 4,4 - bis(perfluoroalkyl) - 3 - butenoic acid when heated in the presence of a bis(perfluoroalkyl)ketene and a Lewis acid catalyst is converted into the δ-lactone of 5-hydroxy-2,2-bis(perfluoroalkyl) - 3 - keto - 6,6-bis(perfluoroalkyl)-4-hexenoic acid in substantial yields among other products. Further, it has been found that the β-lactone of 3-hydroxy-4,4-bis(perfluoroalkyl)-3-butenoic acids when thermally heated with or without the presence of a Lewis base is converted in high yields into the δ-lactone of 5 - hydroxy - 2 - bis(perfluoroalkyl)acetyl-3-keto-6,6-bis(perfluoroalkyl)-4-hexenoic acid. Further it has been found that the δ-lactone of 5-hydroxy-2-bis(perfluoroalkyl)-acetyl - 3 - keto - 6,6 - bis(perfluoroalkyl)-4-hexenoic acid is produced in substantial yield among other products when bis(perfluoroalkyl)ketene and acetic anhydride are heated together. Further, it has been discovered that the δ-lactone of 5-hydroxy-2,2-bis(perfluoroalkyl)-3-keto-6,6-bis(perfluoroalkyl)-4-hexenoic acid and the δ-lactone of 5-hydroxy-2-bis(perfluoroalkyl)acetyl-3-keto-6,6-bis(perfluoroalkyl)-4-hexenoic acid are produced in substantial yield among other products when bis(perfluoroalkyl)ketene and an acetyl halide is thermally heated in the presence of a Lewis acid. The perfluoroalkyl groups in the above compounds can be the same or different and contain from 1 to 8 carbon atoms.

The conditions for carrying out the processes are temperatures of 30 to 300° C. but the optimum temperature is 100° C. Usually the reaction is completed within a few hours; however it may be extended to 8 to 10 days. Autogenous pressures of subatmospheric to about 50 atmospheres are used. The ratio of the reactants for the processes using bis(perfluoroalkyl)ketene and acetic anhydride or acetyl halides may vary widely from less than stoichiometric quantities to a large excess of the bis (perfluoroalkyl)ketene. For best results, at least 2 moles of the bis(perfluoroalkyl)ketene to 1 mole of acetic anhydric or acetyl halide is used. The organic acid anhydrides and halides used in this invention are ketene precursors. For example, acetic anhydride, acetyl fluoride, acetyl chroride, acetyl bromide, anh acetyl ioride are used. Lewis acids, used in the processes of this invention are well known to the chemical art (see G. N. Lewis, Valence and the Structure of Atoms and Molecules, The Chemical Catalog Company, Inc., New York, N.Y., p. 142). Broadly speaking, a Lewis acid is, by definition, simply a molecule, the structure or configuration of which electronically speaking, is so arranged that the molecule is electron-deficient and is capable of being an acceptor of one or more electrons from a molecule which has one or more unshared electrons. A Lewis base by this same definition is an electron-rich molecule which is capable of being a donor of one or more electrons. Various compounds, such as halides of boron, aluminum, zinc, +3 valence iron, and +4 valence tin; hydrohalides; sulfuric acid, phosphoric anhydride; and phosphoric acid are Lewis acids. Various compounds such as amines, phosphines, ethers, and sulfides are Lewis bases. The amount of Lewis acid and Lewis base used in the processes of this invention may vary from 0.01% or less to 5.0% or more. For optimum yield in the process requiring a Lewis acid, about 2% of anhydrous zinc chloride is used. Neutral process equipment, for example, glass, either with or without an added neutral liquid reaction medium may be used. Liquid reaction media which are aprotic and substantially neutral may be used, for example, ether, benzene, petroleum, ether, glyme, chloroform, carbon tetrachloride and the perfluorinated and per(chlorofluorinated)hydrocarbons.

It is believed that the reaction of bis(perfluoroalkyl) ketene with acetic anhydride or acetyl halide with or without a Lewis acid to produce the δ-lacetones described above proceeds by the in situ formation of ketene which subsequently reacts with bis(perfluoroalkyl)ketene to produce the β-lactone of 3-hydroxy-4,4-bis(perfluoroalkyl)-3-butenoic acid. The β-lactone is a common intermediate for the production of both of the δ-lactones, i.e. the δ-lactone of 5-hydroxy-2,2-bis(perfluoroalkyl)-4-keto-6, 6-bis(perfluoroalkyl)-4-hexenoic acid which is formed by a Lewis acid catalyzed reaction of this intermediate and bis(perfluoroalkyl)ketene whereas the δ-lactone of 5 - hydroxy - 2 - bis(perfluoroalkyl)acetyl - 3 - keto-6,6-bis(perfluoroalkyl)-4-hexenoic acid is formed by a thermal or Lewis base catalyzed reaction of this intermediate. Further, it is believed that ketene is formed by either a thermal reaction of acetic anhydride or acetyl halide or that ketene is formed by the reaction of bis(perfluoroalkyl)ketene with acetic anhydride or acetyl halide.

In order that the invention may be better understood, the following detailed examples are given.

EXAMPLE 1

δ-Lactone of 5-hydroxy-2-bis(trifluoromethyl)acetyl-3-keto-6,6-bis(trifluoromethyl)-4-hexenoic acid

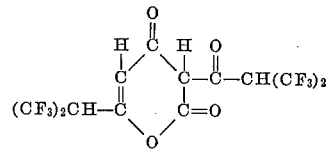

The β-lactone of 3-hydroxy-4,4-bis(trifluoromethyl)-3-butenoic acid (8.9 parts) was sealed in a Carius tube and heated overnight on a steam bath. The solid which formed was recrystallized from carbon tetrachloride to give 8.3 parts of the δ-lactone of 5-hydroxy-2-bis(trifluoromethyl) acetyl-3-keto-6,6-bis(trifluoromethyl)-4-hexenoic acid as a crystalline material, M.P. 76–86° C. Sublimation of this product followed by recrystallization from carbon tetrachloride gave a crystalline material, of M.P. 84–5° C. The proton magnetic resonance spectrum of a 20% solution in acetone consisted of a broad peak at $0.5\tau$, a sharp peak at $3.4\tau$, a septet (J-8 c.p.s.) at $3.93\tau$ and a septet (J-8 c.p.s.) at $4.98\tau$ which were all of equal area. The proton producing the peak at $0.5\tau$ was shown to undergo exchange readily since this peak disappeared when the spectrum was obtained using deuteroacetone as a solvent. The fluorine-19 magnetic resonance spectrum consisted of a pair of doublets (J-8 c.p.s.) corresponding to the septet hydrogens. The infrared absorption spectrum consisted of bands at 3.23, 5.78, 6.01, 6.10, and 6.4μ.

*Analysis.*—Calcd. for $C_{12}H_4F_{12}O_4$: C, 32.75; H, 0.92; F, 51.82. Found: C, 32.75; H, 0.88; F, 51.47.

EXAMPLE 2

*δ-Lactone of 5-hydroxy-2,2-bis(trifluoromethyl)-3-keto-6,6-bis(trifluoromethyl)-4-hexenoic acid*

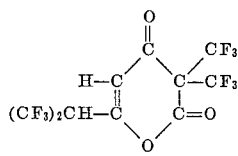

The β-lactone of 3-hydroxy-4,4-bis(trifluoromethyl)-3-butenoic acid (25 parts) was sealed in a Carius tube with 35 parts of bis(trifluoromethyl)ketene and 1 part of zinc chloride. The mixture was heated in a steam bath for ten days. There was recovered 26.5 parts of the δ-lactone of 5 - hydroxy-2,2-bis(trifluoromethyl)-3-keto-6,6-bis(trifluoromethyl)-4-hexenoic acid, B.P., 90° C./18 mm., M.P. 79–80° C., recrystallized from carbon tetrachloride. The infrared absorption spectrum consisted of bands at 3.22, 3.35, 5.50, 5.82 and 5.99μ. The proton magnetic resonance of a 20% solution of the δ-lactone in deuteroacetone consisted of a single sharp peak at $3.72\tau$ and a septet (J-8 c.p.s.) peak centered at $5.06\tau$ all of equal area. The fluorine-19 magnetic resonance consisted of a doublet (J-8 c.p.s.) and a singlet all of equal areas.

*Analysis.*—Calcd. for $C_{10}H_2F_{12}O_3$: C, 30.18; H, 0.50; F, 57.29. Found: C, 29.86; H, 0.66; F, 57.47.

EXAMPLE 3

*δ-Lactones of 5-hydroxy-2,2-bis(trifluoromethyl)-3-keto-6,6-bis(trifluoromethyl)-4-hexenoic acid and 5-hydroxy-2 - bis(trifluoromethyl)acetyl - 3-keto-6,6-bis(trifluoromethyl)-4-hexenoic acid*

A mixture of 15.7 parts of acetyl chloride, 40 parts bis (trifluoromethyl)ketene, and 1 part of zinc chloride was sealed in a Carius tube, and was heated on the steam bath for six days. At the end of this time there was recovered by distillation 16 parts of the δ-lactone of 5-hydroxy - 2,2-bis(trifluoromethyl)-3-keto-6,6-bis(trifluoromethyl)-4-hexenoic acid, boiling mostly at 60° C./25 mm. Hg. This material solidified and was recrystallized from carbon tetrachloride, M.P. 79–80° C. In addition, there was isolated 3.6 parts of the δ-lactone of 5-hydroxy-2-bis (trifluoromethyl)acetyl - 3 - keto-6,6-bis(trifluoromethyl)-4-hexenoic acid boiling mostly at 92° C./1 mm. Hg, M.P. 85–86° C. (recrystallized from carbon tetrachloride). Also recovered from the above reaction mixture was 17 parts of perfluoromethacrylyl fluoride, B.P. 51–52° C.

EXAMPLE 4

*δ-Lactone of 5-hydroxy-2-bis(trifluoromethyl)acetyl-3-keto-6,6-bis(trifluoromethyl)-4-hexenoic acid*

A mixture of 20.4 parts of acetic anhydride and 38 parts of bis(trifluoromethyl)ketene was sealed in a Carius tube and heated two hours on a steam bath. The contents of the tube was then distilled and after removal of 35.8 parts of a lower-boiling mixture there was obtained 10.6 parts of the δ-lactone of 5-hydroxy-2-bis(trifluoromethyl) acetyl - 3 - keto-6,6-bis(trifluoromethyl)-4-hexenoic acid, B.P. 82–86° C./0.75 mm. Hg, which solidified and was recrystallized from carbon tetrachloride, M.P. 85° C. This δ-lactone was shown to be identical with the δ-lactone produced in Example 3 since the melting point of an intimately ground mixture of these two δ-lactones was not depressed.

When the bis(perfluoroalkyl)ketenes in Table I are substituted into the procedure of Example III, the δ-lactones listed in Table I are produced.

TABLE I

| Bis(perfluoroalkyl)ketenes | δ-Lactones |
|---|---|
| (1) Pentafluoroethyltrifluoromethylketene. | δ-lactone of 5-hydroxy-2-trifluoromethyl-2-pentafluoroethyl-3-keto-6-trifluoromethyl-6-pentafluoroethyl-4-hexenoic acid and δ)-lactone of 5-hydroxy-2-(trifluoromethylpentafluoroethyl)acetyl-3-keto-6-trifluoromethyl-6-pentafluoroethyl-4-hexenoic acid. |
| (2) Heptafluoro-n-propyltrifluoromethylketene. | δ-lactone of 5-hydroxy-2-trifluoromethyl-2-heptafluoro-n-propyl-3-keto-6-trifluoromethyl-6-heptafluoro-n-propyl-4-hexenoic acid and δ-lactone of 5-hydroxy-2-(trifluoromethylheptafluoro-n-propyl)-acetyl-3-keto-6-trifluoromethyl-6-heptafluoro-n-propyl-4-hexenoic acid. |
| (3) Nonafluorobutyltrifluoromethylketene. | δ-lactone of 5-dydroxy-2-trifluoromethyl-2-nonafluorobutyl-3-keto-6-trifluoromethyl-6-nonafluorobutyl-4-hexenoic acid and δ-lactone of 5-hydroxy-2-(trifluoromethylnonafluorobutyl)acetyl-3-keto-6-trifluoromethyl-6-nonafluorobutyl-4-hexenoic acid. |

EXAMPLE 5

*Base-catalyzed preparation of the δ-lactone of 5-hydroxy-2 - bis(trifluoromehtyl)-3-keto-6,6-bis(trifluoromethyl)-4-hexenoic acid*

To 2 parts of diethyl ether containing about 0.05 part pyridine was added dropwise 0.5 part of the β-lactone of 3-hydroxy-4,4-bis(trifluoromethyl)-3-butenoic acid. An exothermic reaction occurred. When it subsided, the ether was removed under a current of nitrogen to yield the δ-lactone of 5-hydroxy-2-bis(trifluoromethyl)acetyl-3-keto-6,6-bis(trifluoromethyl)-4-hexenoic acid in the form of an oil which crystallized when succeeded with an authentic sample of the δ-lactone. After recrystallization from carbon tetrachloride, the δ-lactone melted at 85° C.

The products of this invention are useful for imparting water repellancy to paper materials, and for recovery of metals from aqueous solutions. These uses are illustrated by the following examples:

EXAMPLE A

*Treatment of paper to impart water repellancy*

A piece of filter paper was wet by a drop of pyridine followed by several drops of a 25% solution of the δ-lactone of 5-hydroxy-2-bis(trifluoromethyl)acetyl-3-keto-6,6-bis(trifluoromethyl)-4-hexenoic acid in acetone. The paper was then dried and immersed in a beaker of water. The treated portion of the paper was not wet in contrast to the untreated portion which was immediately wet. A control treated as above but omitting the δ-lactone was readily wet.

EXAMPLE B

*Recovery of metals from aqueous solutions*

An immiscible mixture composed of the δ-lactone of 5-hydroxy - 2,2 - bis(trifluoromethyl) - 3 - keto-6,6-bis(trifluoromethyl)hexenoic acid, (10 parts) and water (10 parts) was sealed in a Carius tube and heated overnight on a steam bath. The tube was cooled, carbon dioxide was vented and the crystalline residue was filtered and sublimed to give 7.3 parts of 1,1,5,5-tetrakis(trifluoromethyl)-2,4-pentanedione which was recrystallized from petroleum ether, M.P., 60–60.5° C. Infrared adsorption spectrum consisted of two peaks at 6.05 and 6.25μ. The fluorine-19 magnetic resonance of a 20% solution in deuteroacetonitrile consisted of a doublet (J-8 c.p.s.). The proton magnetic resonance consisted of a septet (area 2, J-8 c.p.c) centered at 5.62τ and a single sharp peak (area 1) at 4.06τ. In addition, there was a single peak at 4.25τ. This latter peak appeared at 3.25τ in the spectrum of a 20% solution in acetonitrile and underwent exchange with the acidic proton of trifluoroacetic acid and with the deuterium in the deuterohydrate of dichlorotetrafluoroacetone. The two peaks of the spectrum, at 5.62 and 4.06τ, remained in the same field location in acetonitrile. Therefore, the 1,3-diketone was considered to exist in the hydrogen-bonded form represented by the formula

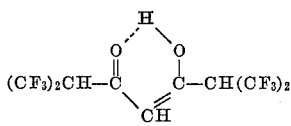

A dilute blue solution of copper ammonia sulfate was shaken in a tube with ether. The ether layer was colorless. Crystals of 1,1,5,5-tetrakis(trifluoromethyl)-2,4-pentanedione produced by the hydrolysis of the δ-lactone of 5-hydroxy-2,2 - bis(trifluoromethyl) - 3 - keto-6,6-bis(trifluoromethyl)-4-hexenoic acid was added to the ether layer and the tube was shaken. Upon separation of the two layers, a blue-green color appeared in the ether layer indicating a transfer of copper ion from the aqueous to the ether layer.

The foregoing detailed description has been given for clarity of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound selected from the group consisting of the δ-lactones of 5-hydroxy-2-bis(perfluoroalkyl)acetyl-3-keto-6,6-bis(perfluoroalkyl)-4-hexenoic acid and the δ-lactones of 5-hydroxy-2,2-perfluoroalkyl-3-keto-6,6-bis(perfluoroalkyl)-4-hexenoic acid, wherein the perfluoroalkyl groups can be the same or different and contain from 1 to 8 carbon atoms.

2. A compound of claim 1 selected from the group consisting of the δ-lactone of 5-hydroxy-2-bis(trifluoromethyl)acetyl - 3 - keto - 6,6 - bis(trifluoromethyl)-4-hexenoic acid and the δ-lactone of 5-hydroxy-2,2-bis(trifluoromethyl)-3-keto - 6,6 - bis(trifluoromethyl) - 4 - hexenoic acid.

3. The process for producing the δ-lactones of claim 1 comprising heating at a temperature between 30 to 300° C. bis(perfluoroalkyl)ketene, wherein the perfluoroalkyl groups can be the same or different and contain 1 to 8 carbon atoms, and acetyl halide in the presence of a Lewis acid catalyst and thereafter recovering said δ-lactones.

4. The process for producing a δ-lactone of 5-hydroxy-2-bis(perfluoroalkyl)acetyl - 3 - keto - 6,6 - bis(perfluoroalkyl)-4-hexenoic acid of claim 1, comprising heating at a temperature between 30 to 300° C. acetic anhydride and a bis(perfluoroalkyl)ketene wherein the perfluoroalkyl groups can be the same or different and contain from 1 to 8 carbon atoms and thereafter recovering said δ-lactone.

5. The process for producing a δ-lactone of 5-hydroxy-2 - bis(perfluoroalkyl)acetyl-3-keto - 6,6 - bis(perfluoroalkyl)-4-hexenoic acid of claim 1, comprising heating at a temperature between 30 to 300° C. in the presence of a Lewis base catalyst, the β-lactone of 3-hydroxy-4,4-bis(perfluoroalkyl)-3-butenoic acid wherein the perfluoroalkyl groups can be the same or different and contain from 1 to 8 carbon atoms and thereafter recovering said δ-lactone.

6. The process for producing a δ-lactone of 5-hydroxy-2 - bis(perfluoroalkyl)acetyl - 3 - keto-6,6-bis(perfluoroalkyl)-4-hexenoic acid of claim 1, comprising heating at a temperature between 30 to 300° C., the β-lactone of 3-hydroxy-4,4-bis(perfluoroalkyl)-3-butenoic acid wherein the perfluoroalkyl groups can be the same or different and contain from 1 to 8 carbon atoms and thereafter recovering said δ-lactone.

7. The process for preparing a δ-lactone of 5-hydroxy-2,2-bis(perfluoroalkyl)-3-keto - 6,6 - bis(perfluoroalkyl)-4-hexenoic acid of claim 1, comprising heating at a temperature between 30 to 300° C. in the presence of a Lewis acid catalyst, the β-lactone of 3-hydroxy-4,4-bis(perfluoroalkyl)-3-butenoic acid and a bis(perfluoroalkyl) ketene wherein the perfluoroalkyl groups can be the same or different and contain from 1 to 8 carbon atoms and thereafter recovering said δ-lactone.

8. The process for producing the δ-lactones of claim 2 comprising heating at a temperature between 30 to 300° C. in the presence of zinc chloride, bis(trifluoromethyl) ketene and acetyl chloride and thereafter recovering said δ-lactones.

9. The process for producing the δ-lactone of 5-hydroxy-2-bis(trifluoromethyl)acetyl-3-keto - 6,6 - bis(trifluoromethyl)-4-hexenoic acid of claim 2, comprising heating at a temperature between 30 to 300° C. bis(trifluoromethyl)ketene and acetic anhydride and thereafter recovering said δ-lactone.

10. The process for producing the δ-lactone of 5-hydroxy-2-bis(trifluoromethyl)acetyl-3-keto - 6,6 - bis(trifluoromethyl)-4-hexenoic acid of claim 2, comprising heating at a temperature between 30 to 300° C. the β-lactone of 3-hydroxy-4,4-bis(trifluoromethyl)-3-butenoic acid and thereafter recovering said δ-lactone.

11. The process for producing the δ-lactone of 5-hydroxy - 2,2 - bis(trifluoromethyl)-3-keto-6,6-bis(trifluoromethyl)-4-hexenoic acid of claim 2, comprising heating at a temperature between 30 to 300° C. in the presence of zinc chloride, the β-lactone of 3-hydroxy-4,4-bis(trifluoromethyl)-3-butenoic acid and bis(trifluoromethyl)ketene and thereafter recovering said δ-lactone.

References Cited

Wagner et al., Synthetic Organic Chemistry (1953), QD 262 W 24, p. 536.

ALEX MAZEL, Primary Examiner.

JOSEPH A. NARCAVAGE, Assistant Examiner.